United States Patent
Grosser et al.

(10) Patent No.: US 7,843,966 B2
(45) Date of Patent: Nov. 30, 2010

(54) COMMUNICATION SYSTEM FOR FLEXIBLE USE IN DIFFERENT APPLICATION SCENARIOS IN AUTOMATION TECHNOLOGY

(75) Inventors: Stefan Grosser, Schnaittenbach (DE); Jürgen Maul, Sulzbach-Rosenberg (DE); Albert Tretter, Pirk (DE)

(73) Assignee: Siemens Aktiengesellschaft, Munich (DE)

( * ) Notice: Subject to any disclaimer, the term of this patent is extended or adjusted under 35 U.S.C. 154(b) by 482 days.

(21) Appl. No.: 11/825,179

(22) Filed: Jul. 5, 2007

(65) Prior Publication Data
US 2008/0021573 A1  Jan. 24, 2008

(30) Foreign Application Priority Data
Jul. 20, 2006  (EP) ................... 06015141

(51) Int. Cl.
*H04J 3/16* (2006.01)
(52) U.S. Cl. .................. 370/469; 370/254
(58) Field of Classification Search .......... None
See application file for complete search history.

(56) References Cited
U.S. PATENT DOCUMENTS

| | | | | |
|---|---|---|---|---|
| 4,554,657 A * | 11/1985 | Wilson | .......... | 370/364 |
| 4,833,605 A | 5/1989 | Terada et al. | | |
| 5,068,783 A * | 11/1991 | Tanagawa et al. | .......... | 714/27 |
| 5,287,454 A * | 2/1994 | Diekmeier et al. | .......... | 709/224 |
| 6,396,841 B1 * | 5/2002 | Co et al. | .......... | 370/401 |
| 6,442,628 B1 * | 8/2002 | Bastiani et al. | .......... | 710/60 |
| 6,529,316 B1 * | 3/2003 | Treyz et al. | .......... | 359/337.11 |
| 6,529,599 B1 * | 3/2003 | Gorshe | .......... | 379/399.01 |
| 6,636,478 B1 | 10/2003 | Sensel et al. | | |
| 6,963,562 B1 * | 11/2005 | McRobert | .......... | 370/362 |
| 7,035,952 B2 * | 4/2006 | Elliott et al. | .......... | 710/300 |
| 7,228,363 B1 * | 6/2007 | Wehrle et al. | .......... | 710/10 |
| 7,426,205 B2 * | 9/2008 | Fechner et al. | .......... | 370/355 |
| 2003/0039243 A1 | 2/2003 | Parker | | |

* cited by examiner

*Primary Examiner*—Robert W Wilson

(57) ABSTRACT

There is described a module for expanding a central module of an automation system, the data transfer between module and central module being accomplished by means of a serial communication system having point-to-point connections in a daisychain or backplane layout and the module having, in a physical layer herefor, at least two transmitters and at least two receivers. There is also described a communication system having at least one module of said kind and a central module. A module for a communication system within an automation system is specified, which module can be flexibly and easily adapted to the respective field of application. There is further described a flexible and scalable communication system for the data transfer between a central module/a CPU and at least one module with the aim of realizing a modular expansion of the central module/CPU. A physical layer can be parameterized in order to adapt it to a predefinable field of application of the module, in particular in terms of speed, availability and/or expandability.

20 Claims, 7 Drawing Sheets

COMMUNICATION SYSTEM FOR FLEXIBLE USE IN DIFFERENT APPLICATION SCENARIOS IN AUTOMATION TECHNOLOGY

CROSS REFERENCE TO RELATED APPLICATIONS

This application claims priority of European application No. 06015141.2 EP filed Jul. 20, 2006, which is incorporated by reference herein in its entirety.

FIELD OF INVENTION

The invention relates to a module for expanding a central module of an automation system, the data transfer between module and central module being accomplished by means of a serial communication system having point-to-point connections in a daisychain or backplane layout and the module having, in a bit transmission layer ("physical layer") for this purpose, at least two transmitters and at least two receivers.

The invention also relates to a communication system of an automation system having a central module expanded by means of at least one module, the data transfer between module and central module being accomplished serially by means of point-to-point connections in a daisychain or backplane layout.

BACKGROUND OF THE INVENTION

A module or communication system of said type is used in particular in automation technology, wherein, depending on the field of application of the automation system or, as the case may be, of a remote I/O system, the focus is on different aspects of communication. Said aspects are, for example, high speed for specialized functions in control and feedback control engineering, deterministic access/clock synchronism for drive engineering and controls, availability in highly available or fault-tolerant systems, hot-plug-in (extraction and insertion) in particular in systems in the process industry, handling/costs for example in production engineering, communication throughput in particular in the routing of PROFIBUS/Ethernet to communication modules, use in decentralized peripherals for remote I/O and expandability. Today's systems are optimized relatively rigidly in respect of one or more of said aspects, the systems supporting the typical requirements of automation technology such as, for example, cyclical I/O transfer, short response times between central module and the at least one module expanding the central module or between the module and the central module for, for example, alarm messages, clock and time-of-day synchronization and high availability. The data transmission takes place in accordance with deterministic factors taking into account defined response times and is usually initiated by the central module.

Prior art solutions are, for example, serial bus systems for use as local (board-to-board) communication systems based on a daisychain layout or parallel bus systems based on a backplane layout. With serial bus systems, a simple expansion is possible by plugging in modules and said systems have a high degree of flexibility in terms of assembly system ("self-installing variants"). Furthermore said systems are characterized by a small space requirement (in terms of the size of the plugs, mechanical components) and a low power requirement (in terms of the number of drivers, . . . ) and are therefore available as low-cost variants, although they deliver a relatively low performance (serial transmission at bit rates <10 MBd) and relatively high response times. In contrast, parallel systems such as, for example, VME bus or PCI have a relatively high performance (parallel transmission 16-/32-bit), albeit paying a relatively high price for this (four-pin plugs, complex backplanes), a high space requirement (size of the plugs, mechanical components, ASICs, EMC measures), a limited transmission rate (crosstalk, driver technologies, bus structure), a low level of data security (data protection mechanisms), a high power requirement (number of drivers, . . . ) and a low level of flexibility in terms of assembly system (due to fixed backplane layouts).

SUMMARY OF INVENTION

An object underlying the invention is to specify a module for a communication system within an automation system, which module can be flexibly and easily adapted to the particular field of application. A further object underlying the invention is also to specify a flexible and scalable communication system for the data transfer between a central module/a CPU and at least one module with the aim of realizing a modular expansion of the central module/CPU.

This object is achieved in the case of a module of the type cited in the introduction in that the configuration of the physical layer can be parameterized in order to adapt it to a predefinable field of application of the module, in particular in terms of speed, availability and/or expandability. This object is also achieved in the case of a communication system of the type cited in the introduction in that a module according to the invention is provided as the said module.

The communication system described can be optimized for the respective field of application by parameterization of the modules and/or by plugging in additional system components such as e.g. a hub (active signal distributor) or terminals (passive signal distributor), i.e. the basic functionalities required for the respective fields of application are present in all the modules (communication connection) and can be activated accordingly. This results in a maximum degree of flexibility both for the end user and for the manufacturer. Thus, for example, a significant increase in availability can be achieved simply by insertion of a hub component, which is of course important in particular in the case of highly available systems.

Various basic configurations are explained in more detail with reference to the figures. Because of the extensive scope of potential applications described the proposed solution can be scaled over a wide range in terms of performance, functionality and costs.

At the core of the invention is a serial communication system having point-to-point connections between the modules, with the data transmission taking place according to the telegram method. Each module has at least two transmitting/receiving devices ("ports"). The point-to-point (port-to-port) relationships can be used, i.e. configured, correspondingly flexibly. Thus, for example, in the case of a switch from a daisychain layout to a backplane layout, i.e. a rack system, only the terminals need to be replaced. Alternatively, in the course of expansions a plurality of carrier systems for modules can be combined to form a system configuration. In this arrangement the modules according to the invention can be used in the different topology options without hardware or firmware modifications. This means that no special developments are required for the different variants.

As a result of the parameterizable configuration of the physical layer the following advantages of the communication system according to the invention are obtained: 1. scalability in terms of the functionality, i.e. the functionalities can be adapted to the respective application scenario (different topology options in different application scenarios, compatibility), 2. scalability in terms of the costs, i.e. identical modules (and carrier systems) can be used from a low-cost system to a high-performance system; the scaling is achieved based on the performance of the central module and the terminals, 3. scalability in terms of constructional assembly system, i.e. the entire functional spectrum can be covered by practically one assembly system (modules, carrier systems, terminal), whereas different assembly system technologies are necessary for the known solutions, and 4. combination of the advantages of present-day approaches (parallel/serial) to create a "new communication system" which offers the following advantages: high performance or, as the case may be, parallelization possible, low-cost variants possible, high degree of flexibility in terms of the assembly system (daisychain, backplane), scalability, low power dissipation, low space requirement, high data security, high deterministic factors (response times) and adaptation to important requirements of automation technology such as short alarm response times, clock/time-of-day synchronization, etc.

In an advantageous embodiment the module has means for parameterizing the configuration of the physical layer by way of hardware settings. This can be achieved for example by way of pins which are appropriately assigned in the backplane.

In a further advantageous embodiment the module has means for parameterizing the configuration of the physical layer by way of software settings. In this way the configuration that is to be used can be transmitted via the communication system.

In a further advantageous embodiment the module has means for automatically detecting the topology variant daisychain or backplane layout and for appropriately parameterizing the configuration of the physical layer. This removes the need for any action on the part of a user.

BRIEF DESCRIPTION OF THE DRAWINGS

The invention is described and explained in more detail below with reference to the exemplary embodiments illustrated in the figures, in which.

DETAILED DESCRIPTION OF INVENTION

Figure 1:
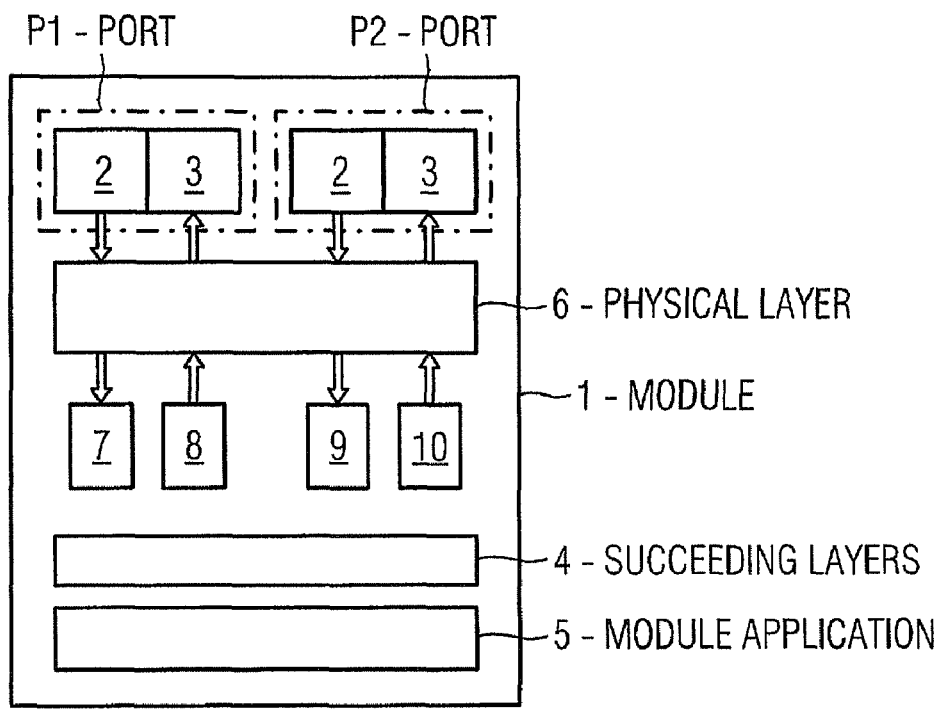
FIG. 1 shows a schematic representation of a module according to the invention.

FIG. 1 shows a schematic representation of an inventive module 1. Said module 1 has two receivers 2 and two transmitters 3 which are combined into two transmitting/receiving devices called ports P1, P2. In this arrangement transmitters 3 and receivers 2 take on the function of a "serializer" and "deserializer" respectively as interfaces to the serial communication system. Telegrams received at the ports P1, P2 are processed further by the physical layer differently depending to the configuration, before they are made available to the succeeding layers 4 and finally the module application 5. In this scheme the succeeding layers 4 consist, according to the OSI model (Open Systems Interconnection Reference Model), of: data link layer, network layer, transport layer, session layer, presentation layer and application layer. In this case the configuration of the physical layer according to the invention has, with one exception, no effect on the succeeding communication layers 4 or, as the case may be, the application software 5. Said exception relates to the "dual bus system" option which is explained in more detail with reference to FIG. 10. In principle, each telegram received at one of the ports P1, P2 is made available in a first receive buffer 7 (REC_BUF) of the data link layer, layer 2 in the OSI model, from the succeeding layers 4, Moreover the data link layer can send telegrams passed to a first send buffer 8 (SEND_BUF) to one or both of the ports P1, P2. The module 1 also has a second receive buffer 9 and a second send buffer 10 which are, however, in turn used only for the "dual bus system" option. In this case the specific type of further processing of telegrams that are to be sent or received is in each instance specified by the configuration file of the physical layer 6.

The described module 1 can be flexibly adapted by way of hardware settings such as, for example, pins which are appropriately assigned in the backplane or, as the case may be, by software settings, i.e. changes in the configuration file of the physical layer 6, to the particular system requirements for the particular field of application. Thus, the module 1 can be used without hardware or firmware changes in the different topology options that are illustrated in the following figures without the necessity for special developments for these variants. In this case the physical layer is parameterized in accordance with the statements made in relation to the following figures. The detection of the topology variant daisychain layout or backplane layout can take place automatically here without any action on the part of a user.

Figure 2:
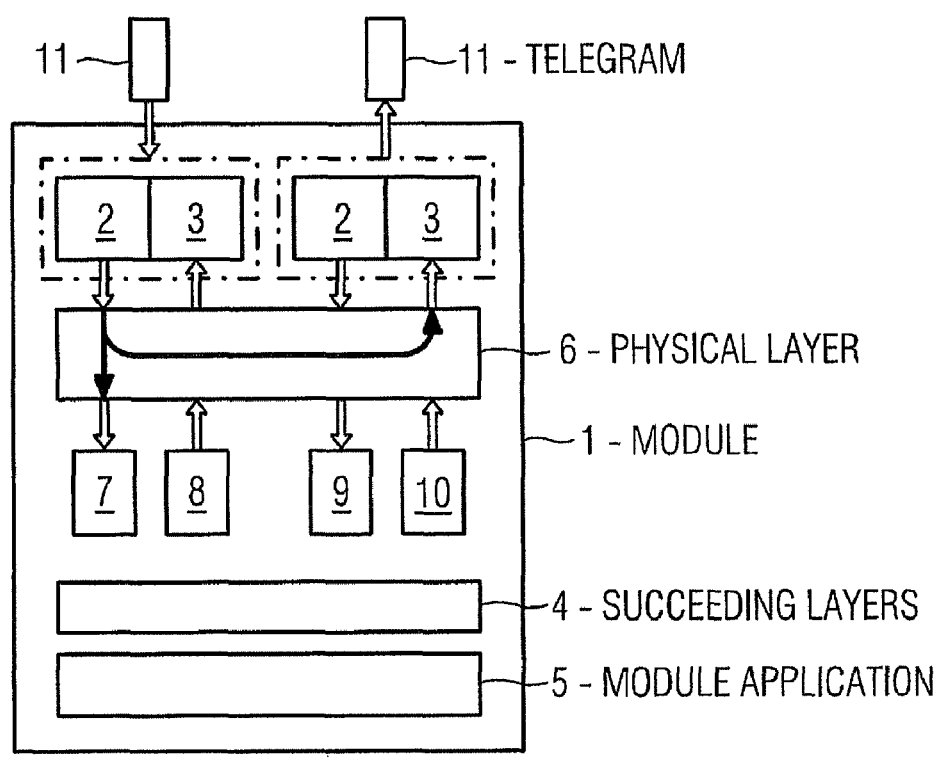
FIG. 2 shows the module from FIG. 1 having a configuration for a daisychain layout.
Figure 5:
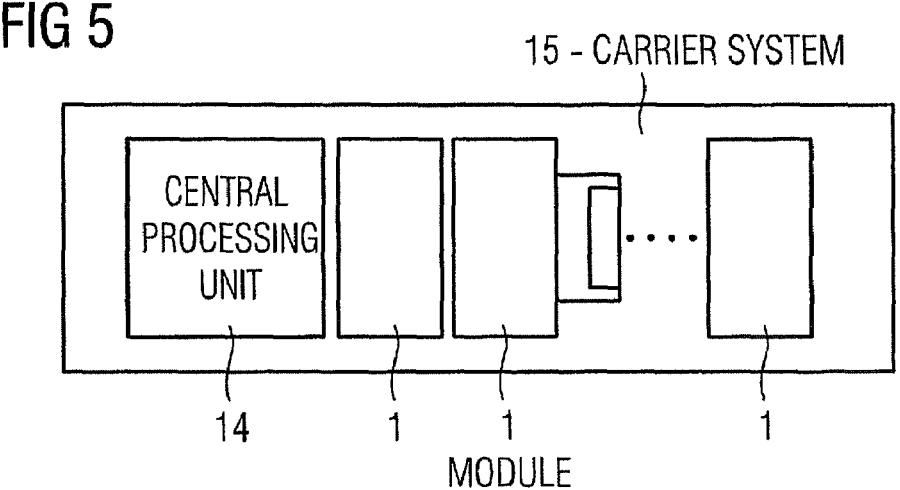
FIG. 5 shows a representation of the system topology of a communication system according to the invention in a daisychain layout.
Figure 6:
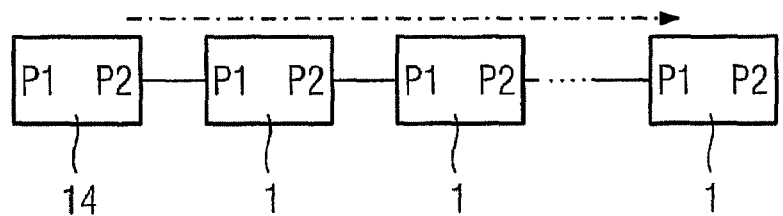
FIG. 6 shows a representation of the communication topology of the communication system from FIG. 5.

FIG. 2 shows the module 1 from FIG. 1, wherein the configuration file of the physical layer 6 is parameterized for a daisychain layout; cf. FIGS. 5 and 6. In this case all incoming telegrams 11 at one port, P1 in the figure, are generally received in the first receive buffer 7 and at the same time re-sent at the other port, P2 in the figure. In addition to the data made up of characters, each telegram 11 consists of a special start character (SD, "StartDelimiter") and a special end character (ED, "EndDelimiter"). The latency time for routing the telegrams 11 through from the receiving port P1 to the sending P2 is reduced to a minimum (typically two to three characters). After the reception of the start delimiter of the telegram 11 a start is made practically immediately to forward the received characters until the through-routing is terminated by the reception of the end delimiter. The through-routing generally takes place in both directions. Furthermore telegrams 11 passed in the first send buffer 8 can be sent via the corresponding ports P1, P2.

Figure 3:
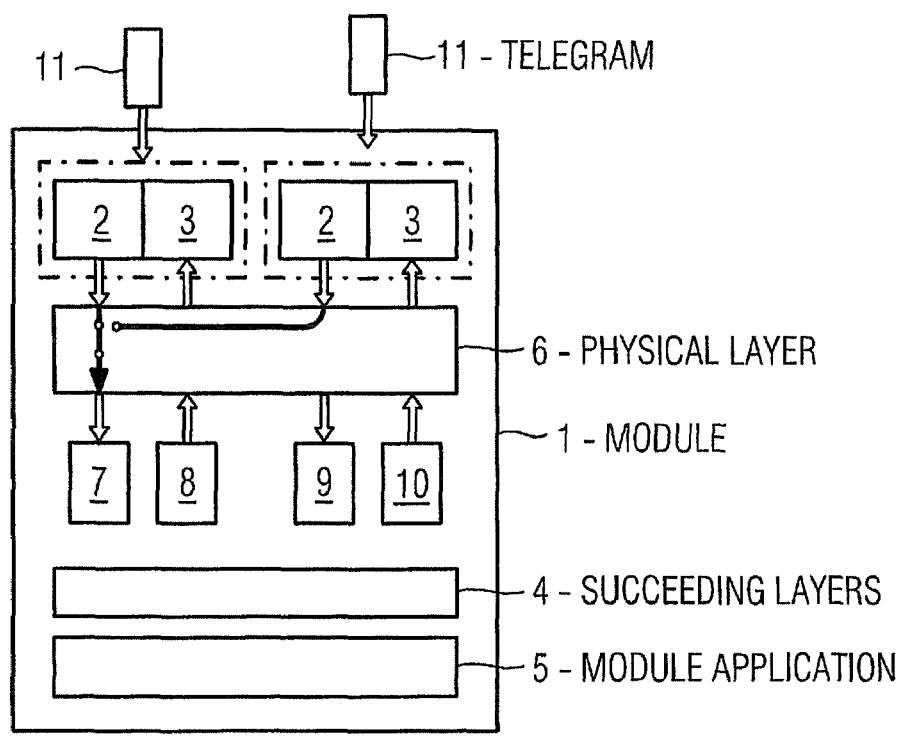
FIG. 3 shows the module from FIG. 1 having a configuration for a backplane layout in the "increased availability" option.

FIG. 3 shows the module 1 from FIG. 1, the configuration file of the physical layer 6 being parameterized in this case for a backplane layout in the "increased availability" option. In the case of a backplane layout, i.e. a rack system, all the telegrams 11 received at a port P1, P2 in each case are generally received in the first receive buffer 7 and not forwarded at the respective other port P2, P1. Furthermore telegrams 11 passed in the first send buffer 8 can be sent via the corresponding ports P1, P2. In the "increased availability" option the communication system has two hub modules and the communication takes place over two channels via both hubs, cf. FIGS. 9 and 10. Each communication job is performed in parallel via both channels (ports P1, P2) and is received at the destination module accordingly at both ports P1, P2.

If a start delimiter is received at the port P1, the telegram 11 is received exclusively by this port P1 until an end delimiter is received. A telegram 11 arriving somewhat later (redundant telegram) is thus discarded. If the second telegram 11 arrives simultaneously at the port P2, a prioritization takes place, e.g. channel 1 (port P1) has precedence. Since telegrams 11 are sent in parallel over two paths in the "increased availability" option, the failure of a path can be bridged or, as the case may be, detected. Furthermore telegrams 11 passed in the first send buffer 8 can be sent via the ports P1 and P2.

Figure 4:
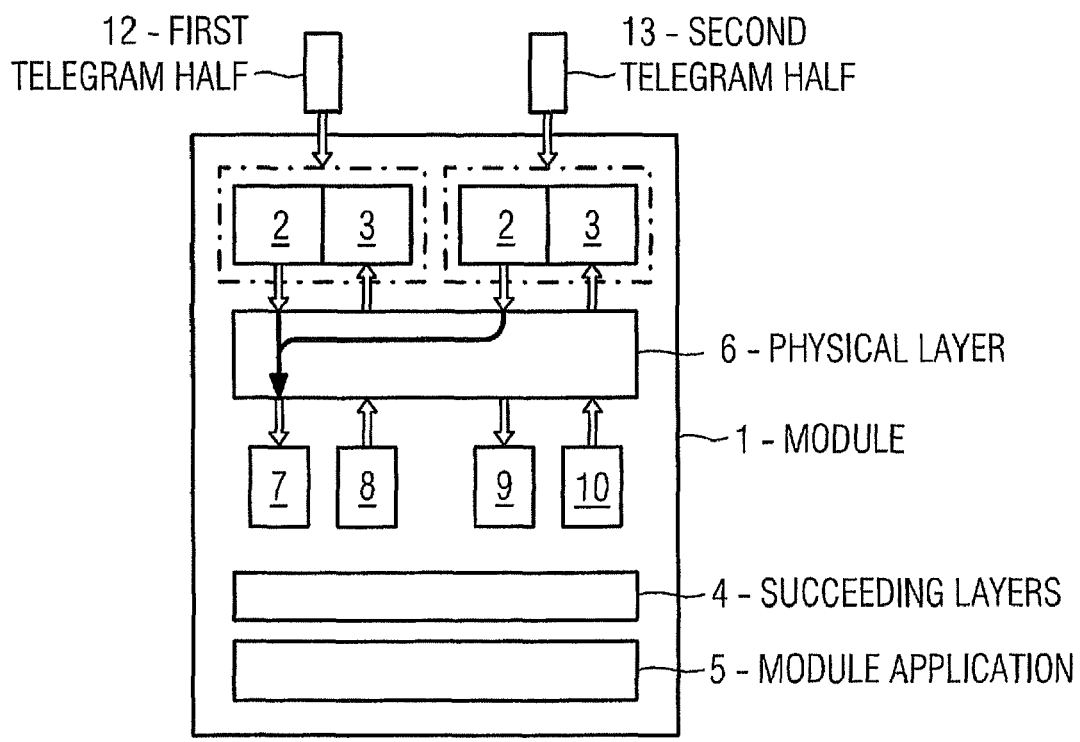
FIG. 4 shows the module from FIG. 1 having a configuration for a backplane layout in the "high-speed slave" option.

FIG. 4 shows the module 1 from FIG. 1, the configuration file of the physical layer 6 being parameterized in this case for a backplane layout in the "high-speed slave" option. In this option a second communication channel is provided in order to double the bandwidth through the use of a second hub in the communication system. In this case a telegram that is to be sent is split into a first telegram half 12 and a second telegram half 13, the first telegram half 12 being sent for example via channel 1 and the second telegram half 13 being sent via channel 2. A split telegram 12, 13 is identified by way of a special start delimiter. In the module 1 the telegram halves 12 and 13 received at the two ports P1 and P2 are reassembled by the correspondingly parameterized configuration file of the physical layer 6 into a telegram and made available in the first receive buffer to the succeeding layers 4 and the module application 5. Furthermore telegrams passed in the first send buffer 8, in each case split into two part telegrams 12 and 13, can be sent via both ports P1 and P2.

FIG. 5 shows a representation of the system topology of a communication system according to the invention in a daisy-chain layout. In this case modules 1 and the central processing unit 14 are secured via simple passive elements (terminals) on a carrier system 15. The expansion is performed in this case based on a module granularity, i.e. the mechanical extension of the layout is determined exclusively by the number of modules 1 to be connected. This is a low-cost variant with corresponding functional restrictions such as, for example, no possibility of extracting or plugging in modules 1 during live operation or, as the case may be, a restricted level of performance.

FIG. 6 shows a representation of the communication topology of the communication system from FIG. 5. In communication technology terms this is a linear structure. In the example shown, a request, symbolized by the arrow, is sent by the central processing unit 14 to the module 1 on the extreme right, the intermediate modules 1 forwarding the request, i.e. receiving it at the port P1 and routing it through to the port P2 which is connected to the port P1 of the adjacent module.

Figure 7:
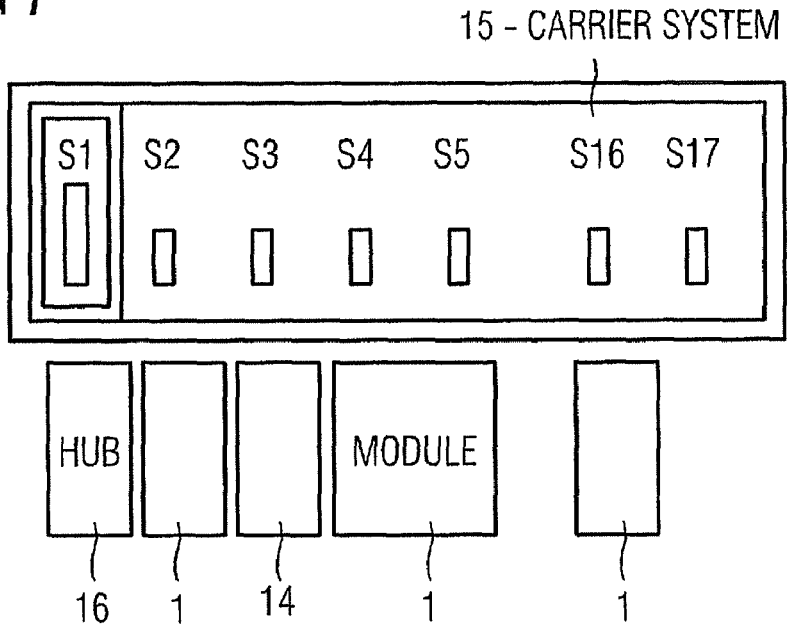
FIG. 7 shows a representation of the system topology of a communication system according to the invention in a backplane layout with a hub.

FIG. 7 shows a representation of the system topology of a communication system according to the invention in a backplane layout with a hub 16. In a rack system of this kind, the modules 1, central processing unit/CPU 14 and hub 16 are secured on the carrier system 15 by way of a passive element (backplane) which provides n mounting locations (slots). The expansion capability is determined in this case by the embodiment of the backplane, with the carrier system 15/backplane being implemented as purely passive. In the rack system specifically, additional options can be realized according to the application scenario.

Figure 8:
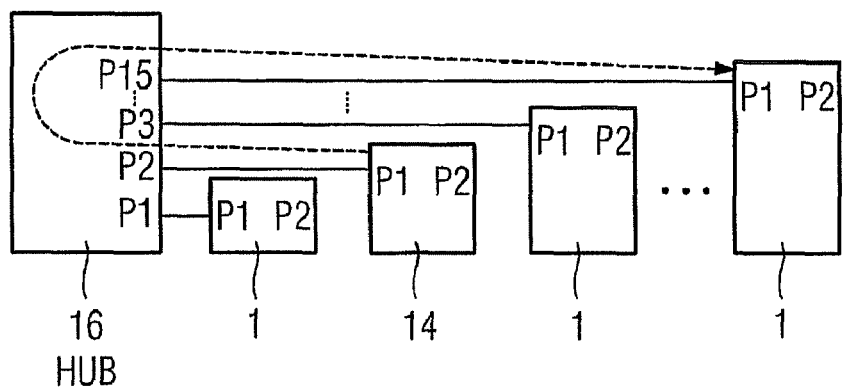
FIG. 8 shows a representation of the communication topology of the communication system from FIG. 7.

FIG. 8 shows a representation of the communication topology of the communication system from FIG. 7. In communication technology terms the topology in this case is a star structure. The communication infrastructure (hub functionality/star) is realized by means of an independent hub module 16. By means of the latter, which has a plurality of ports, P1 to P16 in the example, the modules 1 and the central processing unit 14 are in each case connected via their port P1. A request from the central processing unit 14 to the module 1 on the extreme right in the figure, symbolized by the arrow, is forwarded via the hub 16 to the relevant module 1. In the illustration the CPU 14 is connected to port P3 of the hub module 16 and the requested module 1 is connected to port P16 of the hub 16.

Figure 9:
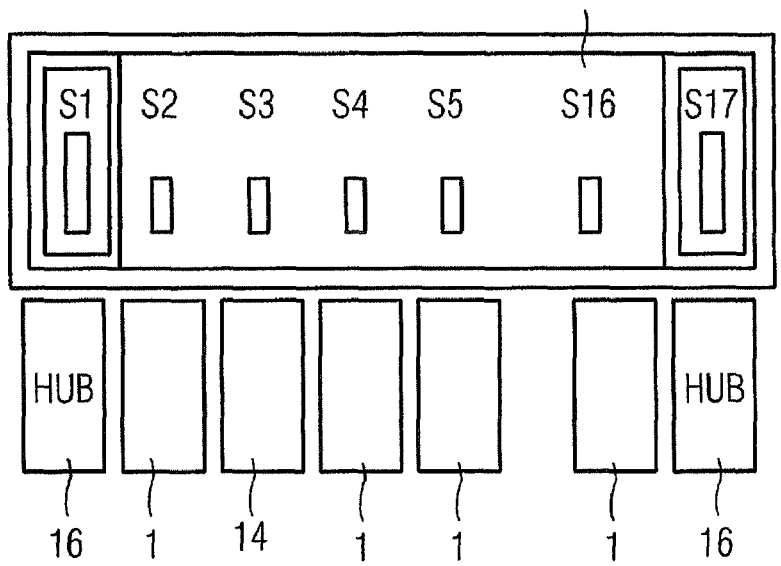
FIG. 9 shows a representation of the system topology of the communication system from FIG. 7 with a second hub.

FIG. 9 shows a representation of the system topology of the communication system from FIG. 7 with a second hub 16, as a result of which a second physical communication channel is provided. By this means various options are made possible, as explained in more detail with reference to FIG. 10.

Figure 10:
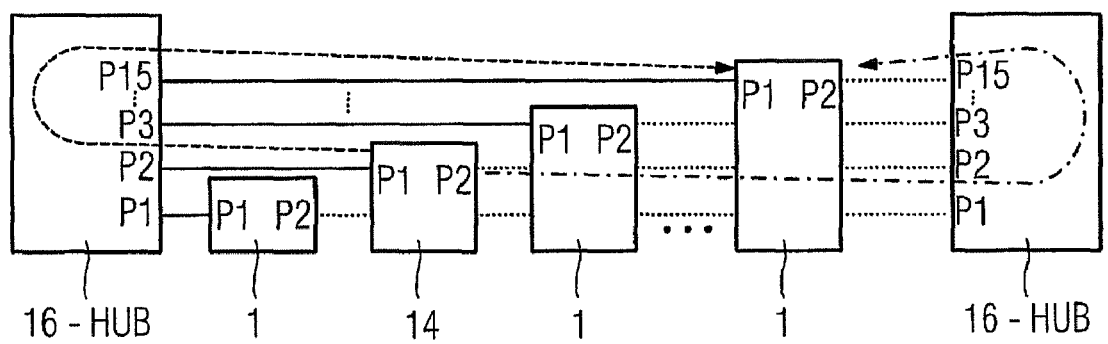
FIG. 10 shows a representation of the communication topology of the communication system from FIG. 9.

FIG. 10 shows a representation of the communication topology of the communication system from FIG. 9. Owing to the two hub modules 16 the CPU 14 has available to it two communication paths to the right-hand module 1, as symbolized by the arrows shown in the drawing. These can be used for different fields of application in different options, where the same backplane can be used for all the options. The variant used is selected exclusively by parameterization of the master or, as the case may be, of the slaves. In this arrangement the backplane (the only element not replaceable during online operation in the "increased availability" option) contains no active elements of any kind and therefore has a particularly high level of availability.

"Increased Availability"

Redundancy of the physical communication channels is achieved by the addition of the second hub module 16. In this case the availability of the system is increased because a failure of the bus infrastructure (hub module 16) does not lead to the failure of the system. In this context communication takes place over two channels via the two hubs 16. Every communication job is sent by the requester (CPU 14) in parallel to channel 1 (P1) and channel 2 (P2). The responder (the module 1 on the right in the example) also receives the job at both ports P1, P2 and sends the response back in parallel on both channels (ports P1, P2). The requester 14 also receives the response at both channels P1 and P2. By means of this method the failure of a channel can be bridged without any reaction. In this variant a hub module 16 can also be replaced during online operation without the communication being interrupted.

"Dual-Bus System"

In principle the two physical channels can be used as independent/autonomous bus systems. As a rule a communication system is faced by two different and opposing requirements:
fast, deterministic accesses with short response times, relatively slow communication, though typically large volumes of data.

If both functionalities are implemented by way of one channel, mutual cross-couplings occur (usually of a timing nature). Said cross-couplings can be prevented by implementing the functionalities by way of different autonomous channels (communication systems). In this "dual-bus system" option the two communication channels can be used fully autonomously, e.g. channel 1 for deterministic transmission and channel 2 for non-time-critical communication.

"High-Speed Slave"

The redundancy of the physical communication channels can also be used to increase the bandwidth, i.e. the bus master sends a telegram 11 via two ports P1, P2. In this case the telegram 11 is transmitted non-redundantly. One half of the telegram 12 is transmitted via port P1, the other half 13 via port P2. A split telegram is identified by way of a special start delimiter. In this way a doubling of the bandwidth is achieved in principle. Corresponding telegrams must be reassembled on the receiver side in accordance with the same algorithm. The algorithm can appear as follows, for example. All odd-numbered bytes are transmitted via port P1 and all even-numbered bytes via port P2.

Figure 11:
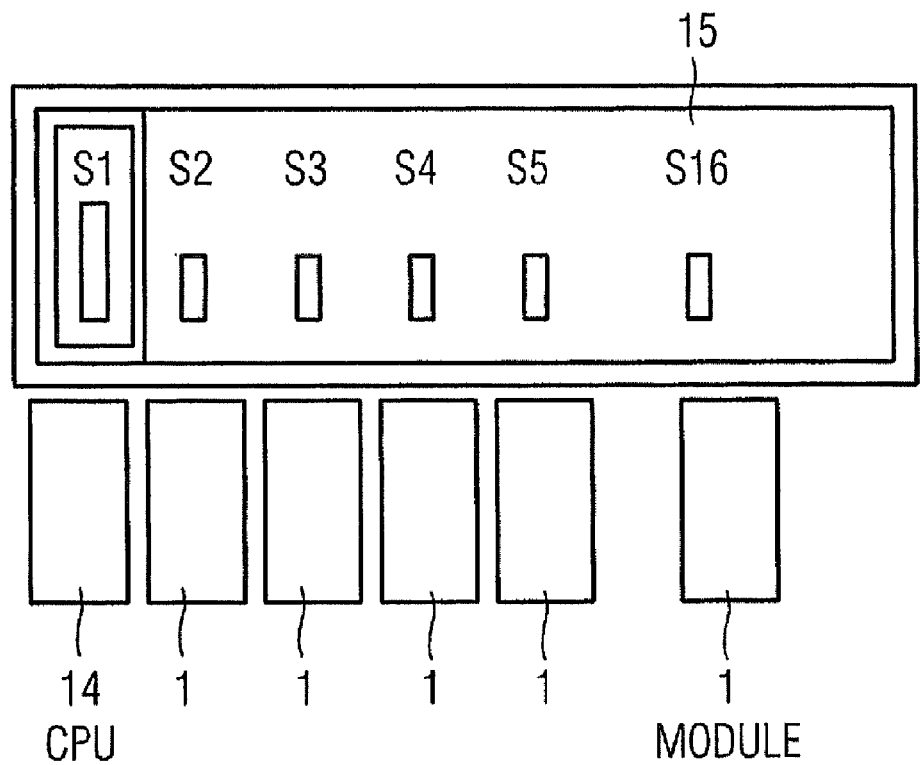
FIG. 11 shows a representation of the system topology of a communication system according to the invention in a backplane layout with a "high-speed master"

FIG. 11 shows a representation of the system topology of a communication system according to the invention in a backplane layout with a "high-speed master". Said "high-speed master" is the central processing unit/CPU 14 which has a plurality of ports, with a module 1 being connected to each port. The I/O transfer typically takes place cyclically within a defined time pattern and is initiated sequentially to each module 1.

Figure 12:
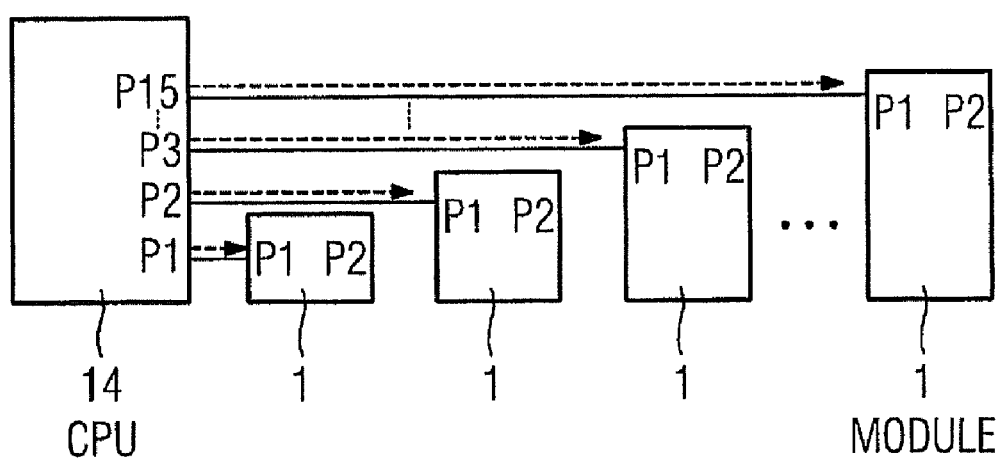
FIG. 12 shows a representation of the communication topology of the communication system from FIG. 11.

FIG. 12 shows a representation of the communication topology of the communication system from FIG. 11. Each module 1 is connected by means of its port P1 to a port of the "high-speed master", the central processing unit/CPU 14. Thus, each module 1 is effectively addressed by way of an independent bus, i.e. in this option a full parallelization of the I/O transfer is achieved—the I/O modules 1 are addressed simultaneously, which in the case of ten modules 1 usually leads to a tenfold increase in the available bandwidth.

Figure 13:
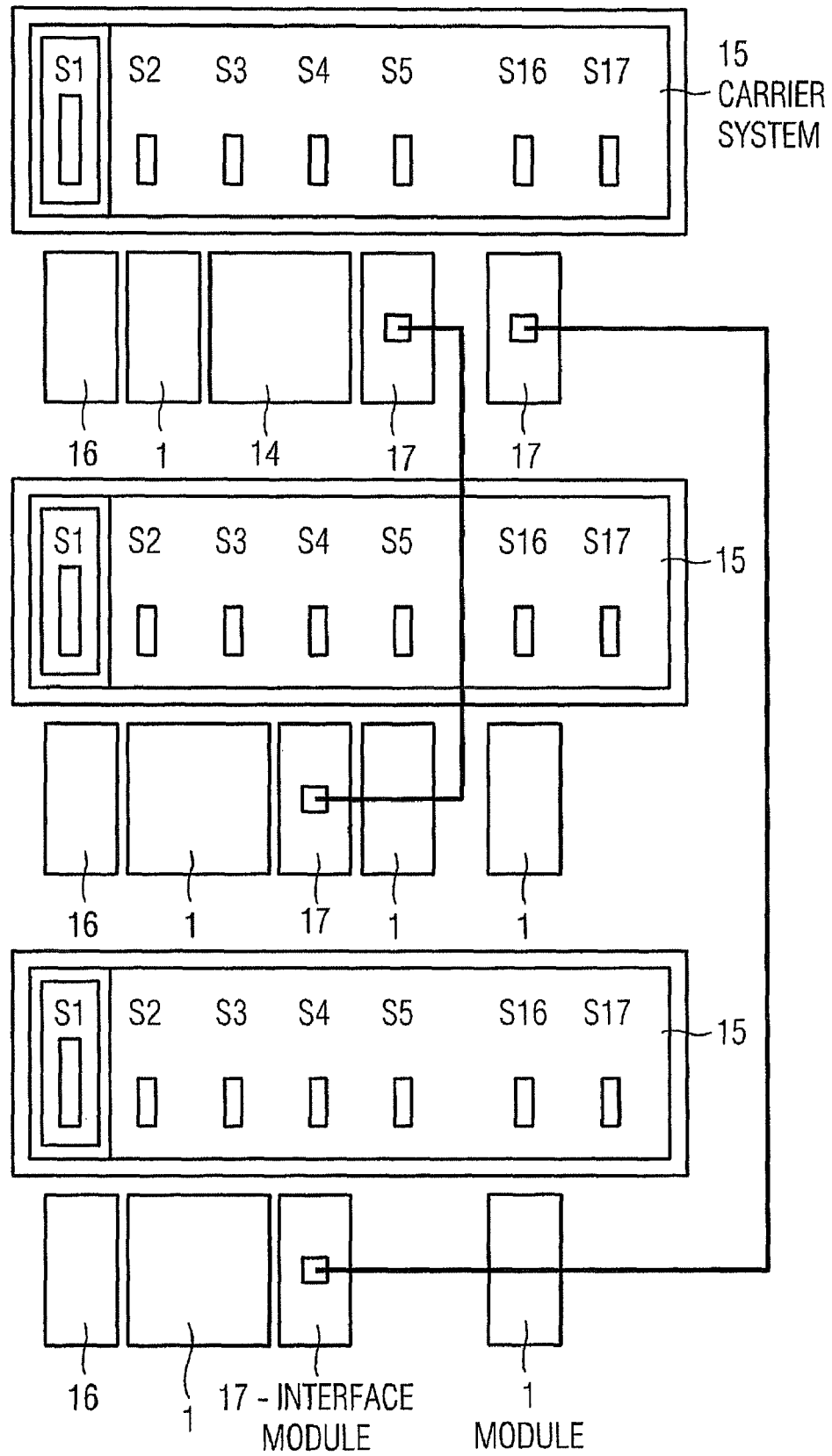
FIG. 13 shows a representation of the system topology of a communication system according to the invention in an embodiment expanded by two carrier systems.

FIG. 13 shows a representation of the system topology of a communication system according to the invention in an embodiment expanded by two carrier systems 15. Said expansion is implemented simply by plugging in an interface module 17 to which a further hub 16 is connected via a further interface module 17 on a further carrier system 15, to which further hub 16 further modules 1 can in turn now be connected.

Figure 14:
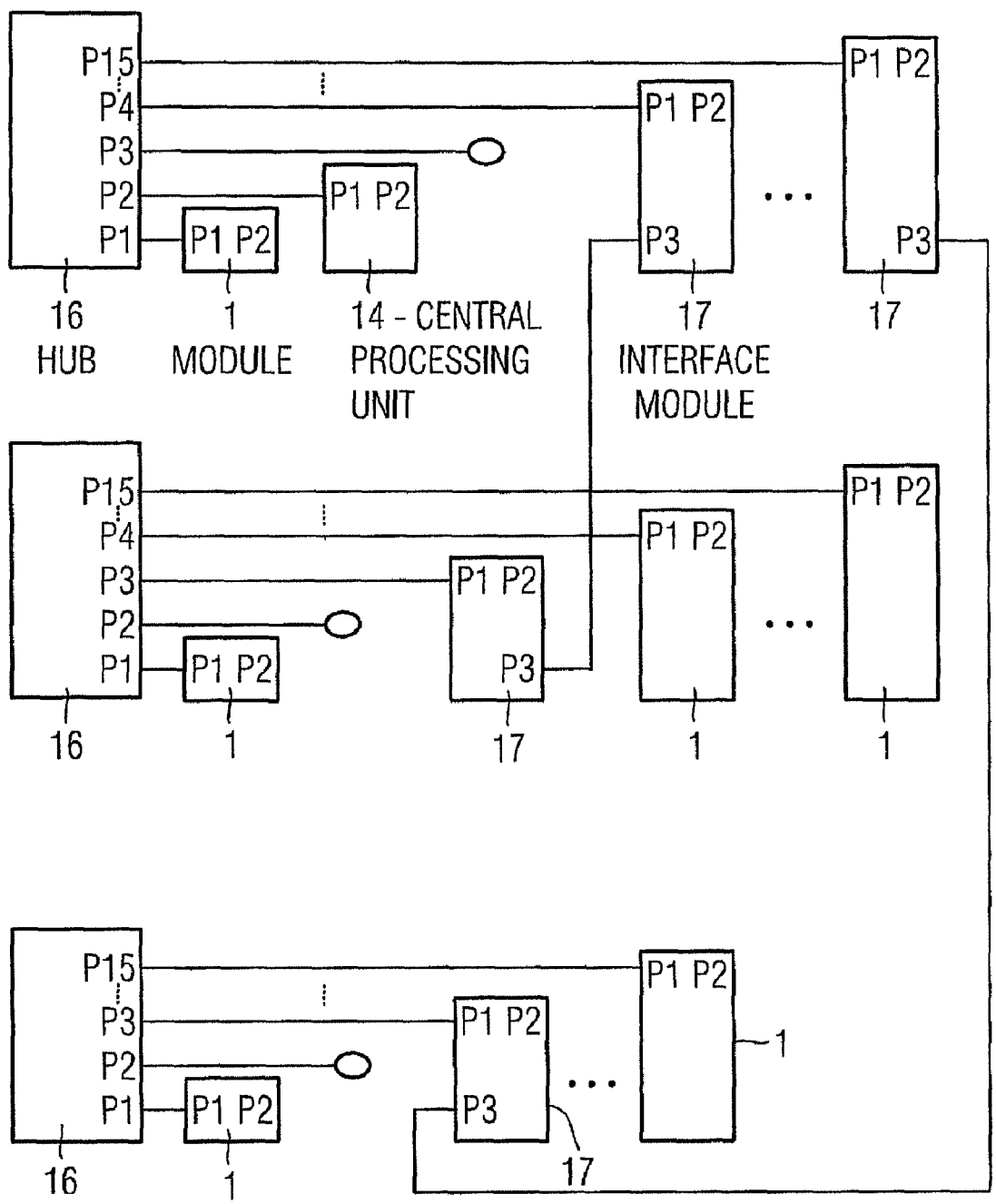
FIG. 14 shows a representation of the communication topology of the communication system from FIG. 13.

FIG. 14 shows a representation of the communication topology of the communication system from FIG. 13. By plugging in a component, an interface module 17, the system can be expanded by one or more carrier systems 15 with n modules 1 or slots. In this case the modules 1 are addressed for example using the convention (rack.slot), where the racks, the carrier systems 15, can be sequentially numbered in the example from top to bottom as Rack0, Rack1, Rack2 and slot specifies the number of the slot in the respective rack. Thus, for example, the address of the middle hub module 16 is (1.1), while the address of the bottom interface module 17 is (2.4).

To sum up, the invention relates to a module for expanding a central module of an automation system, wherein the data transfer between module and central module is accomplished by means of a serial communication system with point-to-point connections in a daisychain or backplane layout and wherein the module has, in a physical layer herefor, at least two transmitters and at least two receivers. The invention also relates to a communication system having at least one module of said kind and one central module. The object underlying the invention is to specify a module for a communication system within an automation system, which module can be flexibly and easily adapted to the respective field of application. The object underlying the invention is also to specify a flexible and scalable communication system for the data transfer between a central module/a CPU and at least one module with the aim of realizing a modular expansion of the central module/CPU. This object is achieved in the case of a module of the type cited in the introduction in that the configuration of the physical layer can be parameterized in order to adapt it to a predefinable field of application of the modules in particular in terms of speed, availability and/or expandability.

The invention claimed is:

1. A communication system of an industrial automation system comprising:
    a central processing unit;
    a module to expand the central processing unit;
    a serially point-to-point connection to transfer data between the module and the central processing unit,
    a physical layer for communication, wherein the physical layer has a configuration which is adaptable based upon parameterization in accord with one of multiple predefined fields of application of the module in the automation system so that the module can be used in multiple different topologies without requiring hardware or firmware modifications, there being a parameter for selecting a predefined field which is used to configure the module in accord with a selected field of application, and wherein the module has:
    at least two transmitter for the physical layer, and
    at least two receiver for the physical layer, and ports,
    wherein, based on at least one parameter, a configuration file of the physical layer is applied to provide a daisy chain layout, and wherein an incoming telegram at a first port is received in a first receive buffer and re-sent at a second port,
    wherein a predefined field of application is selected via the parameter, the parameter being used to configure the module in according with the selected field of application, and wherein the data transfer between the central processing unit and the module is optimized for the selected field of application by the parameterization of the module."
    with A communication system of an industrial automation system comprising:
    a central processing unit;
    a module to expand the central processing unit;
    a serially point-to-point connection to transfer data between the module and the central processing unit,
    wherein the module comprises:
    a physical layer for communication, wherein the physical layer has a configuration which is adapted based upon parameterization in accord with one of multiple predefined fields of application of the module in the industrial automation system so that the module can be used in multiple different topologies without requiring hardware or firmware modifications, a parameter for selecting a predefined field of the multiple predefined fields of application of the module, the parameter being used to configure the module in accord with a selected predefined field of application of the module,
at least two transmitter for the physical layer, and
at least two receiver for the physical layer, and
ports, wherein, based on at least one parameter, a configuration file of the physical layer is applied to provide a daisy chain layout, and wherein an incoming telegram at a first port is received in a first receive buffer and re-sent at a second port,
wherein the selected predefined field of application of the module is selected via the parameter, wherein a data transfer between the central processing unit and the module is optimized for the selected predefined field of application by the parameterization of the module.

2. The communication system as claimed in claim 1, wherein the serial point-to-point connection is based on the daisychain layout.

3. The communication system as claimed in claim 1, wherein the serial point-to-point connection is based on a backplane layout.

4. The communication system as claimed in claim 1, further comprising at least one hub.

5. The communication system as claimed in claim 1, further comprising at least one interface module for expanding the communication system.

6. The communication system as claimed in claim 1, further comprising terminals for switching from the daisychain layout to a backplane layout.

7. The communication system as claimed in claim 1, wherein a telegram has data, a start character and an end character.

8. A communication system of an industrial automation system comprising:
a central processing unit;
a module to expand the central processing unit;
a serially point-to-point connection to transfer data between the module and the central processing unit,
wherein the module comprises:
a physical layer for communication, wherein the physical layer has a configuration which is adapted based upon parameterization in accord with one of multiple predefined fields of application of the module in the industrial automation system so that the module can be used in multiple different topologies without requiring hardware or firmware modifications,
a parameter for selecting a predefined field of the multiple predefined fields of application of the module, the parameter being used to configure the module in accord with a selected predefined field of application of the module,
at least two transmitter for the physical layer, and
at least two receiver for the physical layer, and
wherein a telegram has characters, and wherein a latency time for routing the telegram through from a receiving port of the module to a sending port of the module is two to three characters long, and
wherein the selected predefined field of application of the module is selected via the parameter, wherein a data transfer between the central processing unit and the module is optimized for the selected predefined field of application by the parameterization of the module.

9. The communication system as claimed in claim 8, wherein the serial point-to-point connection is based on a daisychain layout.

10. The communication system as claimed in claim 8, wherein the serial point-to-point connection is based on a backplane layout.

11. The communication system as claimed in claim 8, further comprising at least one hub.

12. The communication system as claimed in claim 8, further comprising at least one interface module for expanding the communication system.

13. The communication system as claimed in claim 8, further comprising terminals for switching from a daisychain layout to a backplane layout.

14. The communication system as claimed in claim 8, wherein the telegram has data, a start character and an end character.

15. A method of expanding a central processing unit of an industrial automation system with a serial communication system:
providing a central processing unit;
providing a module for expanding the central processing unit;
Transferring data between the module and the central processing unit via a serially point-to-point connection;
wherein the module comprises:
a physical layer, wherein the physical layer is adapted based upon parameterization in accord with one of multiple predefined fields of application of the module in the industrial automation system so that the module can be used in multiple different topologies without requiring hardware or firmware modifications,
a parameter for selecting a predefined field of the multiple predefined fields of application of the module the parameter being used to configure the module in accord with selected predefine field of application,
at least two transmitters for the physical layer, and
at least two receiver for the physical layer,
selecting a predefined field of application of the multiple predefined fields of application of the module via the parameter wherein a data transfer between the central processing unit and the module is optimized for the selected predefined field of application by the parameterization of the module, and
wherein a telegram has characters, and wherein a latency time for routing the telegram through from a receiving port of the module to a sending port of the module is two or three characters long.

16. The method as claimed in claim 15, wherein the serial communication system has point-to-point connections in a daisychain layout.

17. The method as claimed in claim 15, wherein the serial communication system has a backplane layout.

18. The method as claimed in claim 15, further comprising:
detecting automatically by the module whether to provide a topology of a daisychain layout or a backplane layout via a parameter; and
configuring the physical layer based upon the parameter to provide the topology.

19. The method as claimed in claim 15, further comprising:
detecting automatically by the module a daisychain layout of the communication system or a backplane layout of the communication system based on a parameter provided to configure the physical layer.

20. The method as claimed in claim 15, wherein the module has pins for parametrizing the configuration of the physical layer, the pins being used to define the configuration.

* * * * *

UNITED STATES PATENT AND TRADEMARK OFFICE
CERTIFICATE OF CORRECTION

| | | |
|---|---|---|
| PATENT NO. | : 7,843,966 B2 | |
| APPLICATION NO. | : 11/825179 | |
| DATED | : November 30, 2010 | |
| INVENTOR(S) | : Stefan Grosser, Jürgen Maul and Albert Tretter | |

It is certified that error appears in the above-identified patent and that said Letters Patent is hereby corrected as shown below:

In the Claims

In claim 1, col. 8, delete lines 24-53.

In claim 1, col. 8, line 54,
delete "with A communication system of an industrial automation"
and insert --A communication system of an industrial automation--.

Signed and Sealed this
Twenty-fourth Day of June, 2014

Michelle K. Lee
*Deputy Director of the United States Patent and Trademark Office*